United States Patent [19]
Bridge

[11] 3,807,076
[45] Apr. 30, 1974

[54] APPARATUS FOR THE PREPARATION OF PLASTIC FILM
[75] Inventor: William A. Bridge, Midland, Mich.
[73] Assignee: The Dow Chemical Company, Midland, Mich.
[22] Filed: Sept. 15, 1972
[21] Appl. No.: 289,484

Related U.S. Application Data
[62] Division of Ser. No. 56,502, July 20, 1970, abandoned.

[52] U.S. Cl............... 425/455, 214/1 Q, 425/319, 425/391, 425/392
[51] Int. Cl............................................. B65g 7/00
[58] Field of Search .......... 425/319, 325, 391, 392, 425/402, 455; 214/1 Q, 1 QG

[56] References Cited
UNITED STATES PATENTS
3,635,634  1/1972  Nagano et al................... 425/392 X
3,181,709  5/1965  Kinnicutt, Jr. et al........... 214/1 QG
2,277,631  3/1942  Bullock........................... 214/1 Q X Primary Examiner—Frank E. Werner
Attorney, Agent, or Firm—Robert I. Ingraham

[57] ABSTRACT
Film is prepared by a trapped bubble process. The inflated tube of plastic material is subsequently further expanded by trapped internal gas to provide a bubble and orientation of the film. Irregularities in the film are randomized by cyclic rotation of the tube and bubble.

Figure 3:
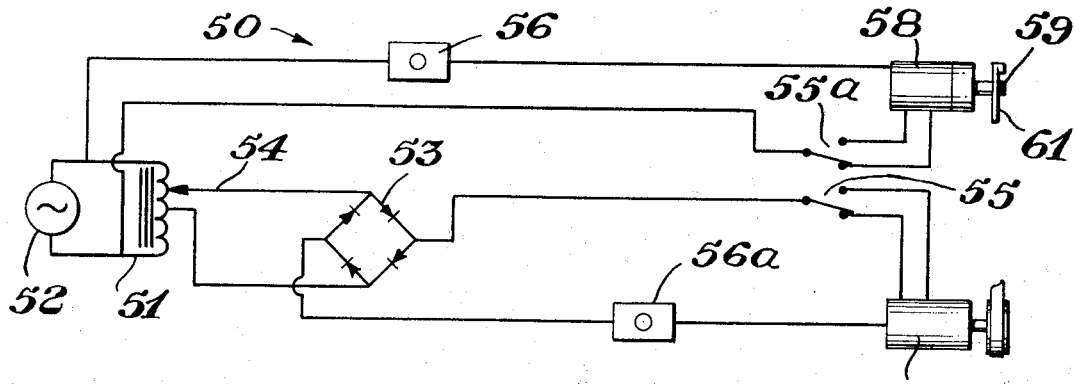

5 Claims, 3 Drawing Figures 3,807,076

APPARATUS FOR THE PREPARATION OF PLASTIC FILM

This application is a divisional application of my co-pending application Ser. No. 56,502, filed July 20, 1970, now abandoned.

Considerable difficulty has been encountered in obtaining film which has a uniform thickness in the transverse direction; that is, the direction normal to which it is extruded. When a film is extruded from either a slot die or a tubing die, generally the thickness of the film has minor variations across the width which may arise from minor irregularities within the die, temperature variations within the melt, uneven cooling of the extruded material prior to stretching and the like. Generally, such variations in thickness do not present a problem until the film is wound onto a roll of substantial size. If, for example, at one location in the film the thickness is 5 percent greater than the remainder of the film when such a film is wound onto a mill roll under tension which may contain several thousand turns of film, the roll would have a portion having a rather substantially greater diameter than the remainder of the roll where the thinner film was disposed. For most thermoplastic materials which cold flow and take a permanent set, the value of the film is substantially reduced because it is no longer lay-flat film, but when unwound from the roll exhibits a permanent deformation in the region of increased diameter; and if a length of film is cut into elongate strips (in the machine direction), the portion corresponding to the region of greater diameter or lump is longer than strips taken from the portion of the roll having a smaller diameter. In many applications, the lack of the lay-flat characteristic is very undesirable. If the film is soft and stretches readily at temperatures normally encountered in such operations as printing, packaging, slitting, re-winding and the like, one can often overcome the non-lay-flat characteristics of the film by added tension. However, the more resistant film becomes to stretching at converting temperatures, such as room temperatures, the greater is the problem presented by a non-lay-flat film. In processes where it is undesirable to stretch the film, such as printing wherein register must be maintained, a non-lay-flat film can be unuseable.

A number of processes have been devised to overcome the problems presented by film which is non-uniform in thickness. These processes have all attempted to distribute the non-uniformities over the width of the roll. In theory, this is readily accomplished, at least in the case of tube extrusion, wherein the extruded tube is slit and wound onto one or more rolls or simply collapsed, edge trimmed and wound as a double wound film by rotating the tube relative to the windup rolls. Various methods have been employed, such as extruding the tube from an extruder mounted on a rotating platform; orienting the tube and winding on a windup stand on a stationary base. Alternately, rotating windup stands have been employed. Rotating dies have also been employed. An alternate procedure is to helically slit the tube. Helically slitting presents substantial mechanical problems. With the exception of helical slitting, rotation of the extruder or die relative to the windup apparatus has demonstrated some remarkable weaknesses in randomizing procedures. Not all thickness variations are introduced into the tube at the die. As the plastic tube is maintained at a stretching temperature, it exhibits a certain amount of viscoelastic characteristics and generally less than the desired amount of rotation or randomization of defects is introduced into the bubble. For example: if one oscillated an extruder 180° relative to the windup roll, one might expect that a line drawn on a tube coming from the extruder would, on the collapsed roll of tubing, extend from one end to the other; that is, cover a region corresponding to one half of the circumference of the tube. Due to various factors, one generally obtains something considerably less than 180°, and in certain instances, distribution is obtained which can be less than 90°.

It would be desirable if there were available an improved and simplified method of distributing variations in film thickness across a film roll prepared by tube extrusion.

It would also be desirable if there were available an improved method and apparatus for distributing such irregularities which was compatible with fixed extrusion apparatus.

It would further be desirable if such a method and apparatus would permit ready adjustment of the degree of randomization independently of the extruder operating conditions.

These benefits and other advantages in accordance with the present invention are achieved in an apparatus for rotating an inflated plastic tube, the apparatus comprising a fixed frame, the frame defining a passage adapted to pass an inflated plastic tube therethrough, a rotatable frame rotatably attached to the fixed frame, the rotating frame defining a rotating frame passage therethrough adapted to receive an inflated plastic tube, the fixed frame passage and rotating frame passage being aligned to permit passage of inflated tube, tube engaging means supported by the rotating frame, the tube engaging means being generally circularly disposed about the rotating frame passage, the tube engaging means being adapted to engage an inflated tube passing through the passages and means to oscillate the rotatable frame in a regular manner.

Also contemplated within the scope of the present invention is a method for the preparation of extruded thermoplastic film wherein a tube of a synthetic resinous thermoplastic material is extruded from an annular die and inflated by means of a gas contained therein to provide a tube having a diameter generally commensurate with the diameter of the die from which it is extruded, the tube being subsequently enlarged without restriction to a desired diameter substantially greater than initial tube diameter by means of a trapped volume of gas therein, the enlarged tube being subsequently collapsed to a flattened form to provide a plastic film, the film subsequently wound onto a roll, the improvement which comprises rotationally oscillating the tube relative to both the extruder and a collapsing means. Preferably, the tube has a maximum angular displacement of at least about 180° (or integral multiple thereof).

Figure 1:
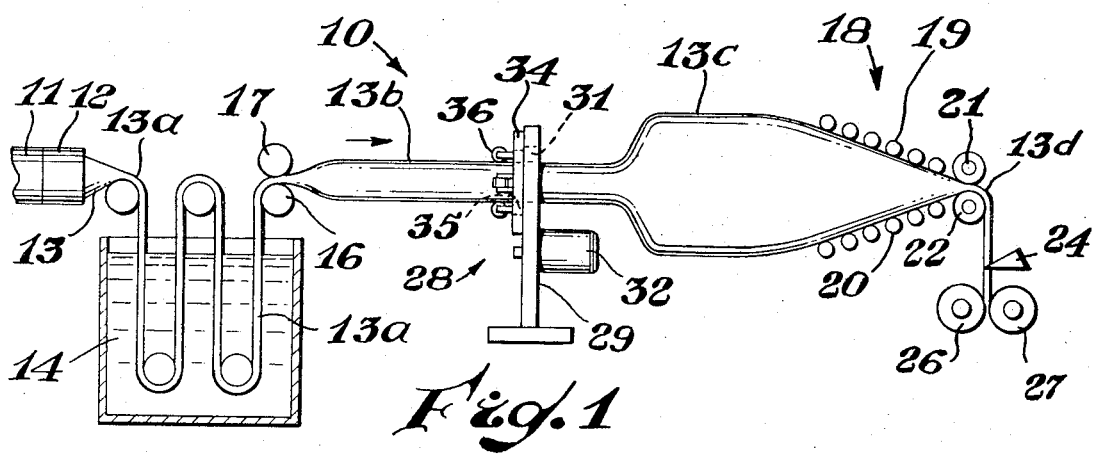

Further features and advantages of the present invention will become more apparent from the following specification taken in connection with the drawing wherein:

FIG. 1 schematically depicts apparatus of the invention and practice of the process of the invention.

Figure 2:
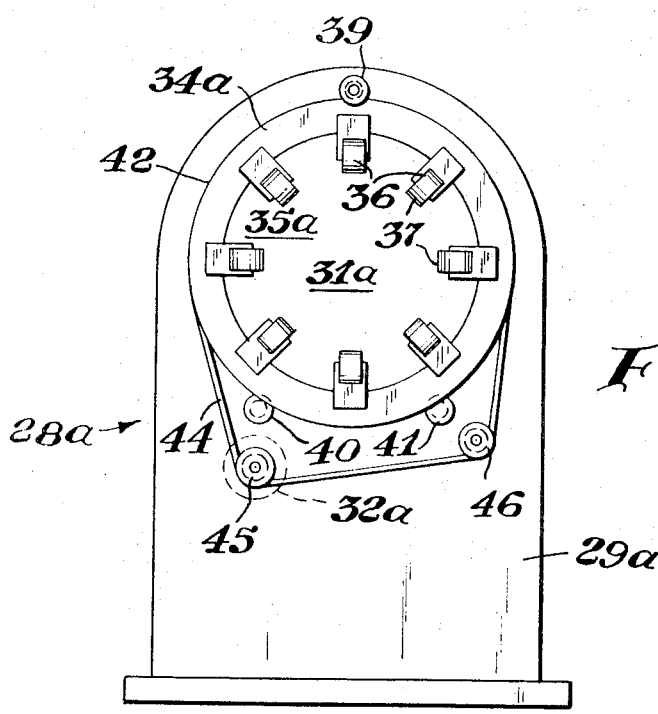

FIG. 2 is a view of the tube twisting apparatus of FIG. 1.

FIG. 3 schematically depicts a drive control of the tube rotating apparatus of FIGS. 1 and 2.

In FIG. 1 there is schematically depicted apparatus for the production of plastic film, the apparatus being generally designated by the reference numeral 10. The apparatus 10 comprises in cooperative combination the terminal portion of an extruder 11 having an annular or tubing die 12. A plastic tube 13 is shown emerging from the die 12. A cooling mandrel (not shown) is within the tubing 13 adjacent the die 12. The tubing 13 is flattened to form a tube 13a and festooned through a temperature controlled bath 14. The tube 13a on emerging from the cooling bath 14 is passed between nip rolls 16 and 17. Passing through the nip rolls and proceeding in the direction indicated by the arrow, the tube 13a is inflated to form a tube 13b which has a diameter which is generally commensurate with the diameter of the tubing 13 and the annular orifice of the die 12. As the tube 13b proceeds in the direction of the arrow, it is stretched to form a bubble or enlarged tubular portion 13c by means of a volume of gas trapped therein. The bubble 13c is flattened by means of a collapsing assembly 18 comprising a first generally linear series of parallel rolls 19 and a second generally similar pair of rolls 20, often referred to as converging or collapsing rolls. The collapsed bubble 13c is passed between nip rolls 21 and 22 to provide a collapsed tube 13d. The tubing 13d is passed to a pair of edge slitters 24 which may be single blade or rotary knives wherein edge portions of the collapsed tube 13d are removed to provide two webs of film which are subsequently wound onto the takeup or mill rolls 26 and 27. A tube rotating means generally designated by the reference numeral 28, is in operative engagement with the external surface of the tube portion 13b at a location spaced from the nip rolls 16 and 17 and generally adjacent the bubble 13c. The rotating means 28 comprises a fixed frame 29 having a tubing passage 31 defined therein. A drive means or motor 32 is supported on the fixed frame 29. A rotating frame 34 is rotatably supported on the fixed frame 29. The frame 34 defines a tubing passageway 35. A tube engaging means or a plurality of rolls 36 is pivotally supported on the rotating frame 34 and the periphery of the rolls is in operative engagement with the tube 13b. The rolls 36 rotate about axes which are perpendicular to the axis of the tube 13b and the axis of any of the rolls 36 lie in a plane generally normal to the plane containing the axis of the tube 13b.

In FIG. 2 there is shown a less schematic view of a tube rotating apparatus such as the apparatus 28, generally designated by the reference numeral 28a. The apparatus 28a comprises a fixed frame member 29a defining a tubing passageway 31a and supporting a drive motor 32a. A rotating frame 34a is rotatably supported by the frame 29a by means of frame engaging wheels 39, 40 and 41 which are rotatably affixed to the frame 29a. The rotating frame 34a has a circular peripheral edge portion 42 which is in operative combination with a driving means such as the belt 44. The wheels 40 and 41 beneficially engage a belt receiving groove, not shown, whereas the wheel 39 receives the entire thickness of the frame 34a. The frame 34a defines a centrally disposed passageway 35a which is in mating relation with the passageway 31a. A plurality of rolls 36a are disposed about the passageway 35a. Each of the rolls 36a has a peripheral surface 37 adapted to engage an inflated plastic tube passing through the passageways 31a and 35a. Conveniently, the drive means 44 passes over an idler pulley 46 which displaces the belt to clear the support wheel 41. Power is supplied to the drive motor 32a by suitable electrical connections, not shown.

In FIG. 3 there is schematically depicted a drive and control means 50 in operative combination with a motor 32c which is suited to rotate the rotating frame, such as the frame 34a. The drive or control means 50 comprises in cooperative combination a center tapped autotransformer 51 in cooperative combination with a suitable alternating current source 52 such as 110 volt 60 cycle line. The center tap of the autotransformer is connected to one of the alternating current legs of a bridge rectifier 53. The remaining alternating current leg of the rectifier 53 is connected to the variable tap 54 of the autotransformer 51. One of the direct current leads from the bridge rectifier 53 is connected to the motor 32c through a motor speed controller 56a. The motor 32c beneficially is a direct current or universal gear head motor which drives the rotating frame 34 or 34a. The remaining leg of the bridge rectifier goes to one pole of a single pole double throw switch 55 which, depending upon its setting, drives the motor 32c in either of the two possible directions. The speed of the motor 32c is dependent upon the position of the tap 54 of the autotransformer 51. As the variable tap is moved from one extreme position to the other extreme position, the speed of the motor varies from maximum through zero, reverses direction of rotation and increases to maximum. Also connected to the source of alternating current is an adjustable motor speed controller 56 and a pole of the single pole double throw switch 55a. The switch 55a selectively connects the line to one of the two leads of an autotransformer to the forward or reverse lead of an autotransformer actuating motor 58. The motor 58 in turn is connected to the speed controller 56. The motor 58 beneficially is also of gear head construction having an output speed substantially less than the motor 32c. The motor 58 has an output shaft 59 which drives the variable tap on the autotransformer 51 and a switch engaging arm or cam 61 which engages the actuating means of the single pole double throw switches 55 and 55a when the motor has driven the variable tap to either one of the two extreme positions. The switch 55a, actuated by the cam 61, reverses the direction of rotation of the autotransformer actuating motor 58. The cam 61 engages the actuating means of the switch 55 when the variable tap and center taps are coincident, causing the motor 32c to reverse.

The speed at which the variable tap 54 traverses the output range of the autotransformer is controlled by the motor speed controller 56. If power is applied to the circuit as shown in FIG. 3, the motor 58 drives the variable tap at a predetermined rate along the winding of the autotransformer until the maximum deviation from center is obtained, whereupon the cam 61 throws the switch 55a, causing the motor 58 to reverse its direction and the motor 32c to reduce its speed of rotation. Generally, snap action switches and stops provided with commercially available electrically driven autotransformers are eminently satisfactory. If one considers the condition wherein the variable tap is generally coincident with the center tap, no voltage is applied to the drive motor 32c and the switch 55 is thrown to change direction of rotation of the motor 32c, but the motor 58 is changing the position of the tap to increase the voltage and the speed of the motor 32c which increases until maximum voltage is reached. The direction of rotation of the motor 58 is reversed when maximum voltage is obtained and the speed of the motor 32c decreases to zero, the direction of rotation is reversed and the motor 32c increases to maximum speed. Thus, as the speed of rotation of the rotating frame, such as the frames 34 and 34a, is directly proportional to the speed of the drive motor, such as the motors 32 and 32a, the rotating frame 34a follows a similar pattern.

In operation of the apparatus as depicted in FIGS. 1 and 2 and controlled by the arrangement of FIG. 3, extrusion of the plastic tube is started. The tube is threaded through the temperature control bath 14, drawn through the passageways and the tube rotator 28. When a sufficient quantity of tube has been drawn through the apparatus 28, air is injected by any convenient means such as by the simple expedient of perforating the tube with a "needle" consisting of a piece of one-fourth inch copper tubing attached to an air hose. When less than a desired quantity of air has been introduced, the tubing is passed between the nip rolls 21 and 22 and an additional air injection made until the bubble 13c has attained the desired size. When desired extrusion conditions have been reached, the variable tap 54 of the autotransformer 51 is set at the zero or neutral position; that is, coincident with the center tap, and power applied to the apparatus 50 from the source 52. The frame 34 begins to rotate slowly in one direction, causing the bubble 13c and the tube 13b to be twisted, thus in effect radially displacing the tube about its longitudinal axis due to the frictional effect of the peripheral surface of the rolls 36. In order to maintain a more or less lineal rotation of the tube, the rate of rotation of the frame 34 must increase. Such an increase in speed is obtained in the manner set forth in the schematic arrangement of FIG. 3.

When extrusion has started and the rotating apparatus 28 is in operation, the tube 13b is alternately twisted back and forth, which results in distribution of the irregularities in thickness, at least across a predetermined bend on the rolls 26 and 27. The amount of rotation introduced by the frame 34 is readily determined by applying a mark, line or series of dots, to the film either as it emerges from the die or from the nip rolls 16 and 17. If the distribution of the mark applied to the tube is less than the total width of the roll, the speed of rotation of the frame 34 must be increased or the rate of oscillation reduced until about 180° (or integral multiple thereof) traverse of the mark is obtained.

The method and apparatus of the present invention are applicable to a wide variety of synthetic resinous thermoplastic materials. Typical of such materials which can be employed are tubes of ethylene acrylic acid copolymers, such as a copolymer of 92 weight percent ethylene and 8 weight percent acrylic acid; chlorinated polyethylene, such as chlorinated polyethylene having 60 weight percent chlorine; extrudable polyesters; polyvinyl chloride; polypropylene, ethylene vinyl acetate; polyethylene, and vinylidene chloride-vinyl chloride polymers such as a polymer of 85 weight percent vinylidene chloride and 15 weight percent vinyl chloride. The method and apparatus of the invention are also useable in bubble processes wherein the tube consists of generally concentric layers of material. Desirably, in order to prevent marking, the outer layer may be composed of one of the hereinbefore delineated polymers. Typical multilayer tubes such as are prepared by the process of simultaneous extrusion of diverse resinous materials may be employed with great benefit. A typical tube has outer layers of polyethylene, an inner layer of vinylidene chloride-vinyl chloride composition and intermediate layers of ethylene vinyl acetate separating the polyethylene from the vinylidene chloride polymer.

By way of further illustration, a tube of a vinylidene chloride-vinyl chloride polymer composition, 85 parts by weight vinylidene chloride, 15 parts by weight vinyl chloride, is extruded in the form of a tube having a diameter of about 10 inches and a wall thickness of about 20 mils. Equipment employed is substantially as depicted in FIG. 1 wherein the distance between the nip rolls 16 and 17 and the rolls 20 and 21 is a distance of about 25 feet. The rotating means or apparatus has 8 rollers and is generally in accordance with that shown in FIG. 2. The rotating apparatus is placed about 7 feet from the rolls 16 and 17. The tubing is inflated with air until the bubble portion, such as the bubble portion 13c, is within about 3 feet of the rotating means 28. When equilibrium extrusion conditions are obtained, the rotating frame, such as the frame 34, is rotated through about 7 revolutions in each direction (14 revolutions) over a period of about seven minutes, wherein the speed of rotation starting from the neutral position is increased to a maximum, decreased to zero, reversed, increased to maximum speed, decreased to zero. A mark placed on the tube adjacent the nip rolls 16 and 17 traverses the entire periphery of flattened tube. Eminently satisfactory randomization or distribution of non-uniformities is obtained.

When the foregoing procedure is repeated employing the hereinbefore described polymers, equally beneficial results are obtained.

It is observed that minor changes in extrusion conditions can result in a requirement that the speed of rotation of the motor 58 be adjusted to maintain precise randomization.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An apparatus for rotating an inflated plastic tube, the apparatus consisting essentially of
   a fixed frame, the frame defining
   a passage adapted to pass an inflated plastic tube therethrough,
   a rotatable frame rotatably attached to the fixed frame, the rotating frame defining
   a rotating frame passage therethrough adapted to receive an inflated plastic tube, the fixed frame passage and rotating frame passage being aligned to permit passage of inflated tube,
   a tube engaging means supported by the rotating frame, the tube engaging means being generally circularly disposed about the rotating frame passage, the tube engaging means being adapted to engage only an external surface of an inflated tube passing through the passages, the tube engaging means comprising a plurality of rolls, each of the rolls having an outer peripheral surface, each of the rolls having an axis, each axis being generally normal to the axis of rotation of the rotating frame and contained in a plane normal to the axis of rotation of the rotating frame, and means to oscillate the rotatable frame in a regular manner.

2. The apparatus of claim 1 including means to reciprocally rotate the rotating frame.

3. The apparatus of claim 2 wherein the means to rotate the rotating frame cyclicly rotates the frame in a first direction from a minimum speed to a maximum speed to a minimum speed and subsequently rotates the frame in a second direction from a minimum speed to a maximum speed to a minimum speed.

4. The apparatus of claim 1 in cooperative combination with a tube extruding apparatus.

5. The apparatus of claim 4 in operative combination with a tube collapsing apparatus wherein the tube rotating apparatus is disposed intermittent between the collapsing apparatus and the extruding apparatus.

* * * * *